Oct. 15, 1968
V. STANCIU
3,405,639
WAX INJECTION MACHINE
Filed June 9, 1966
7 Sheets-Sheet 1
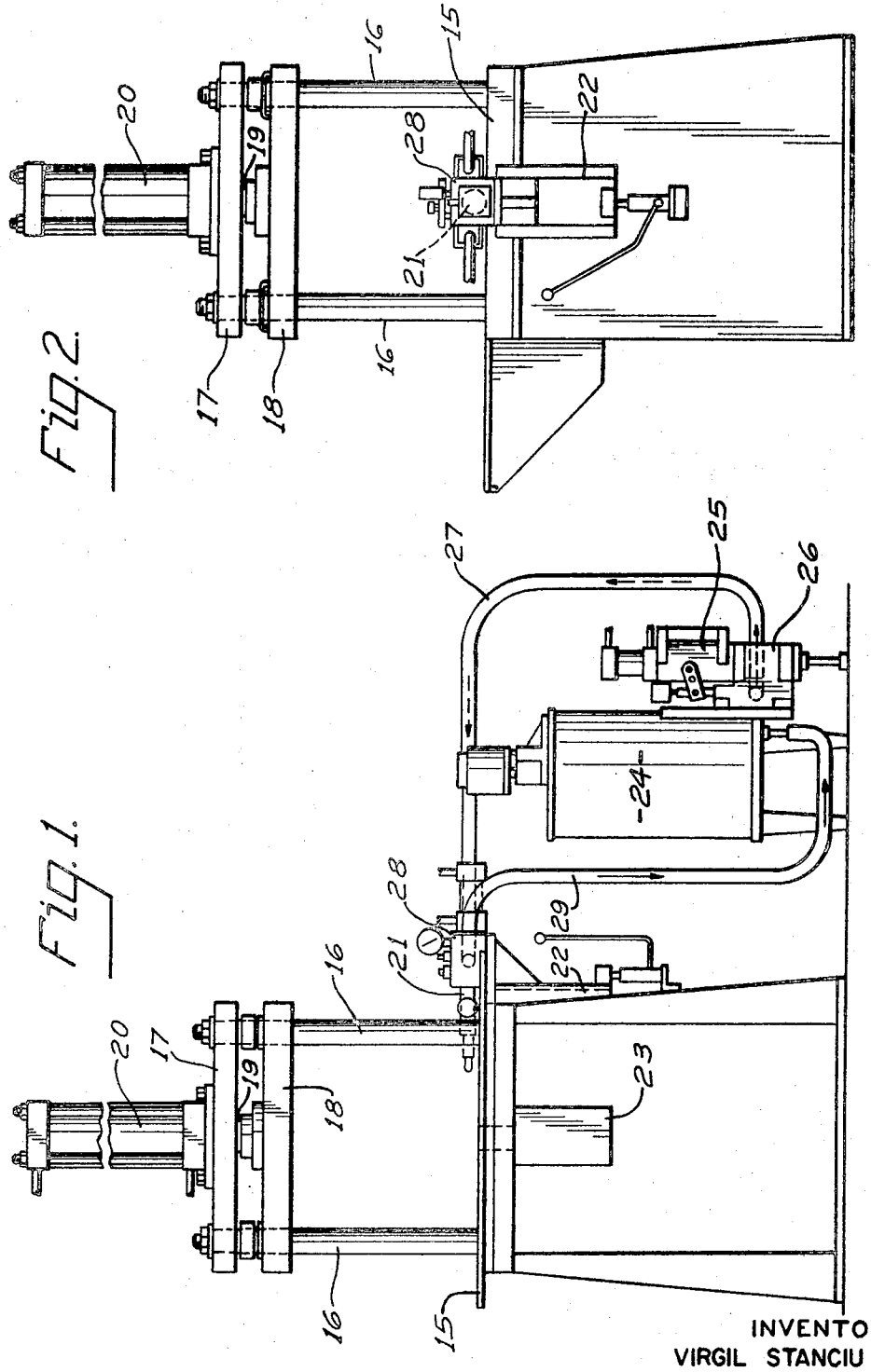
INVENTOR.
VIRGIL STANCIU
BY
Baldwin, Doran & Egan
ATTORNEYS.

Oct. 15, 1968  V. STANCIU  3,405,639
WAX INJECTION MACHINE
Filed June 9, 1966  7 Sheets-Sheet 2

INVENTOR.
VIRGIL STANCIU
BY
Baldwin, Doran & Egan
ATTORNEYS.

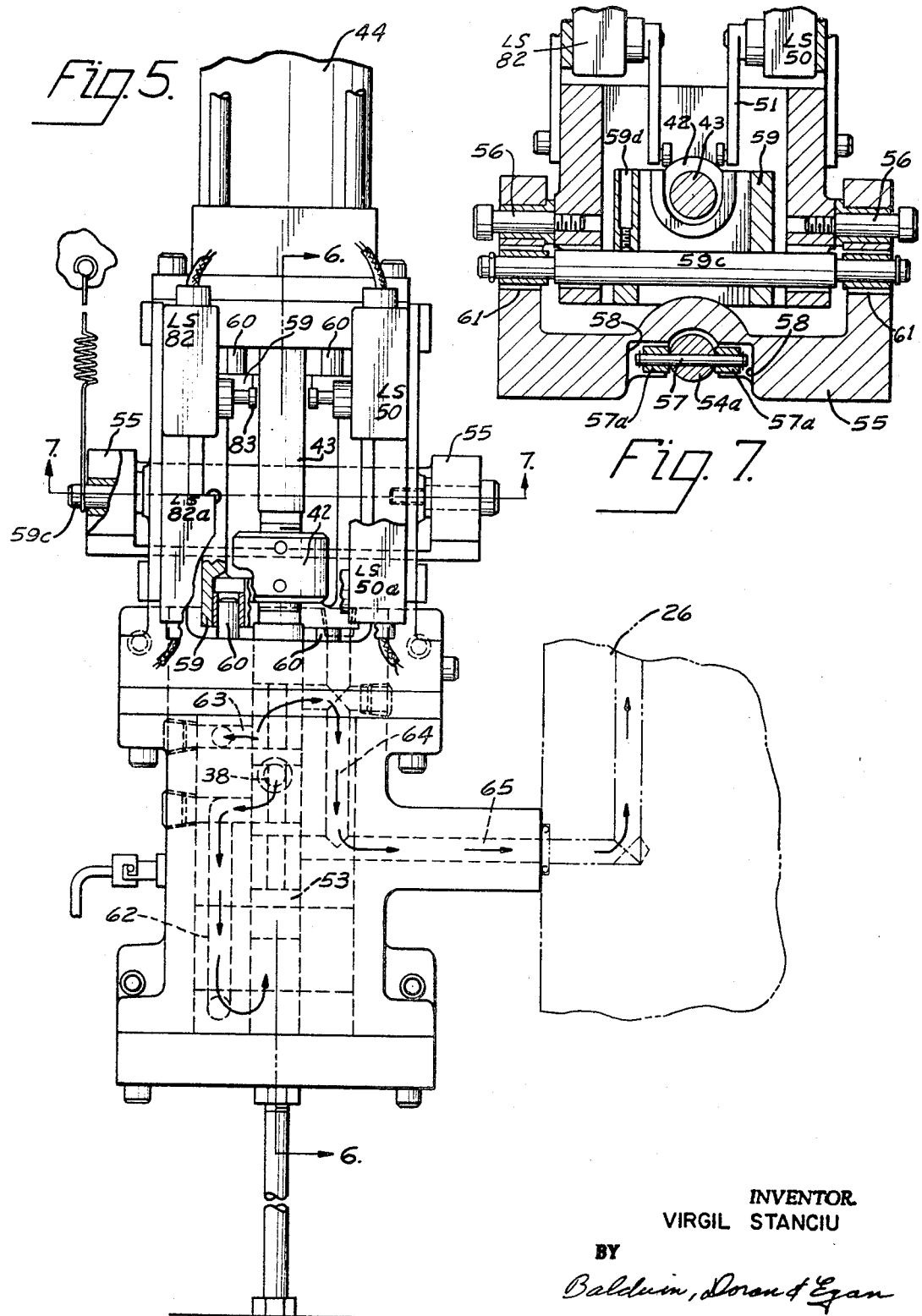

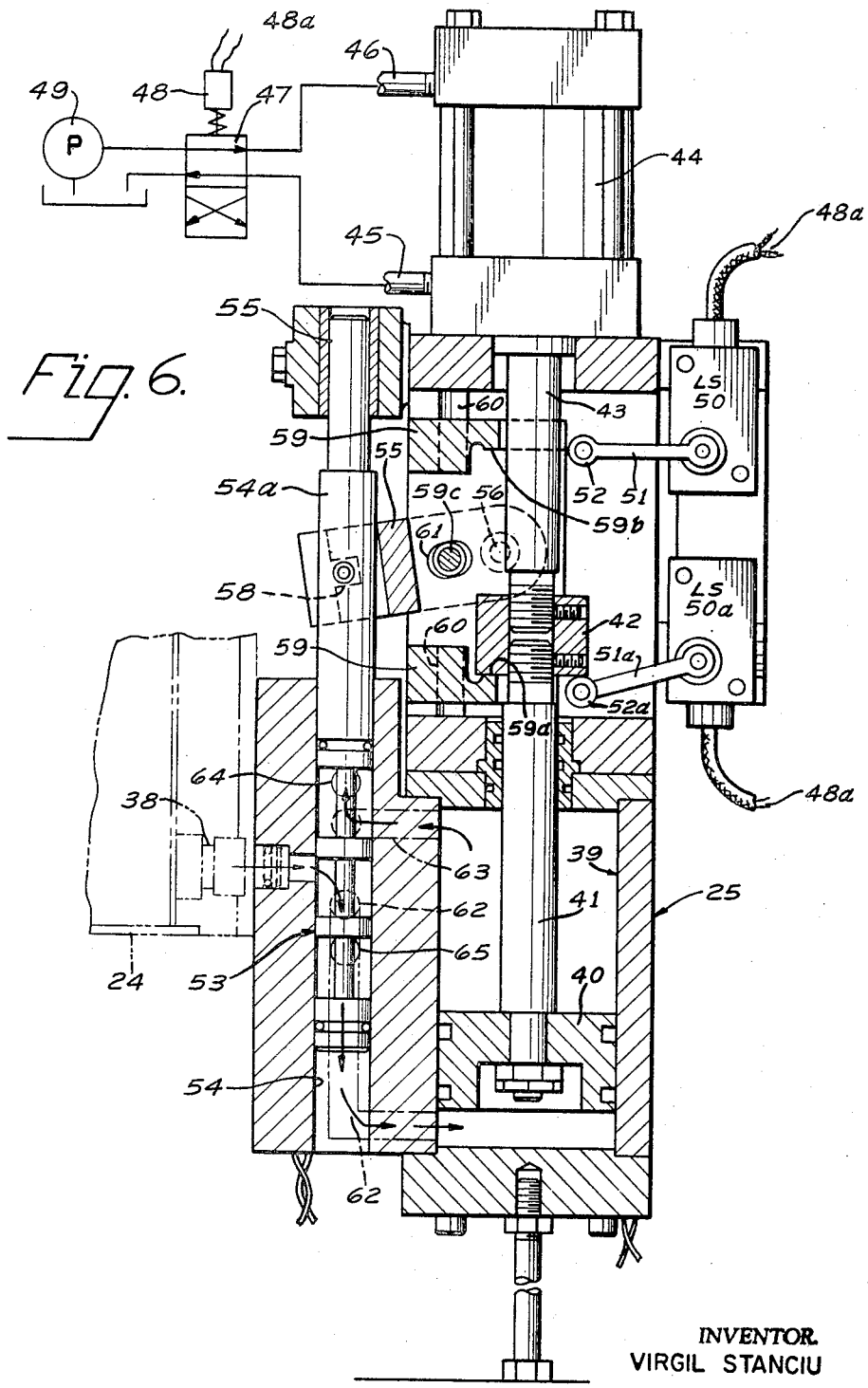

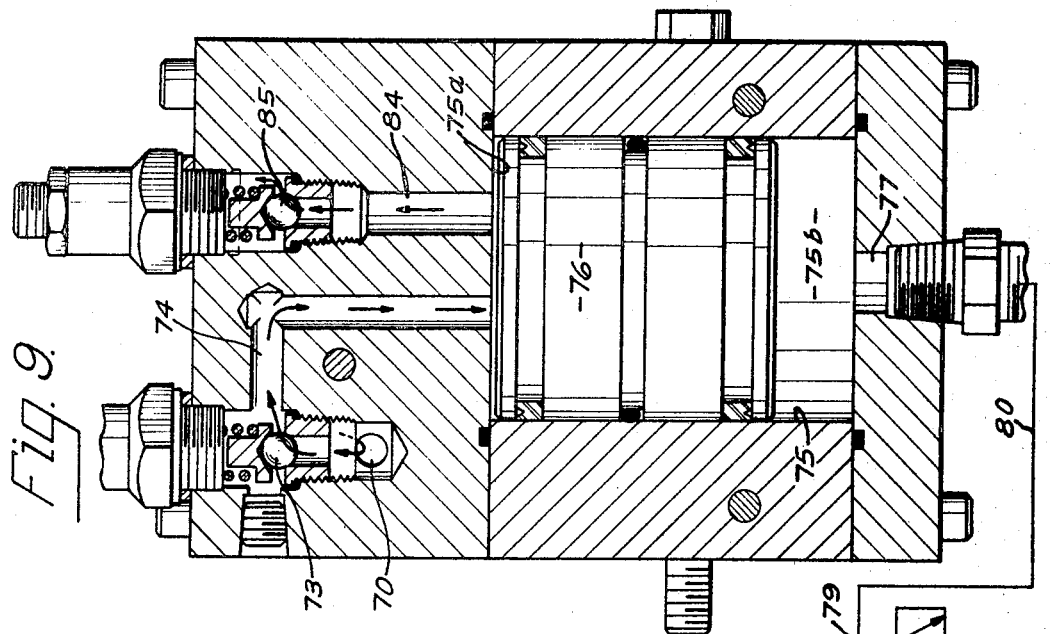
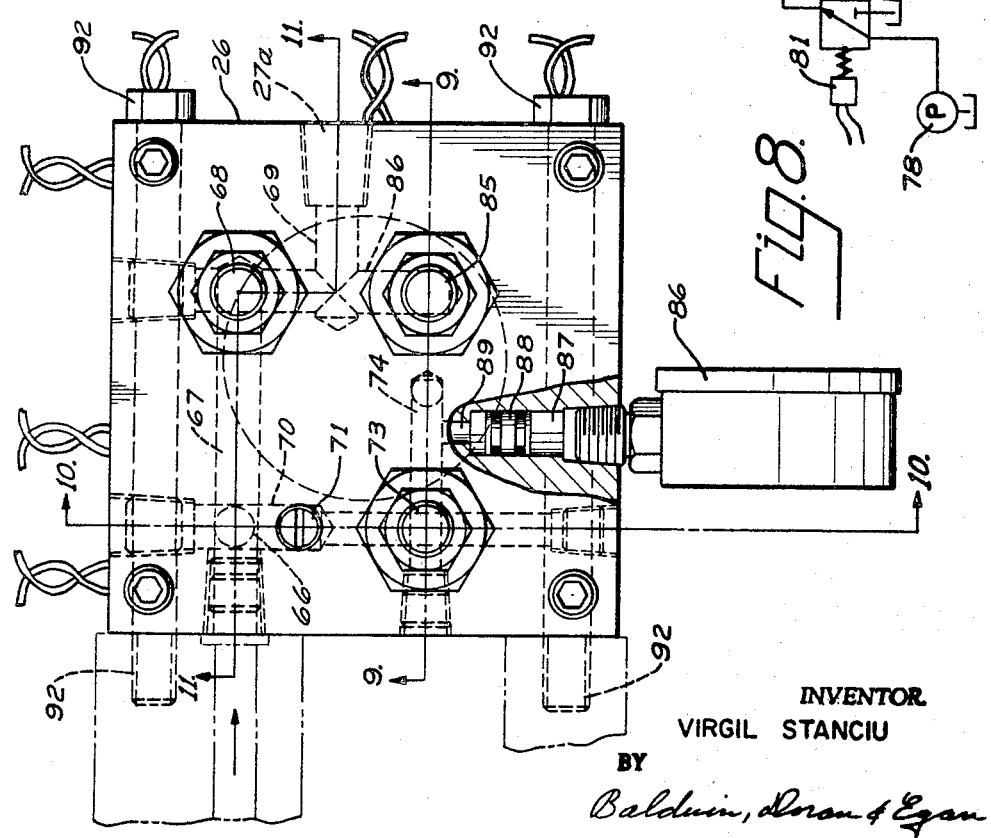

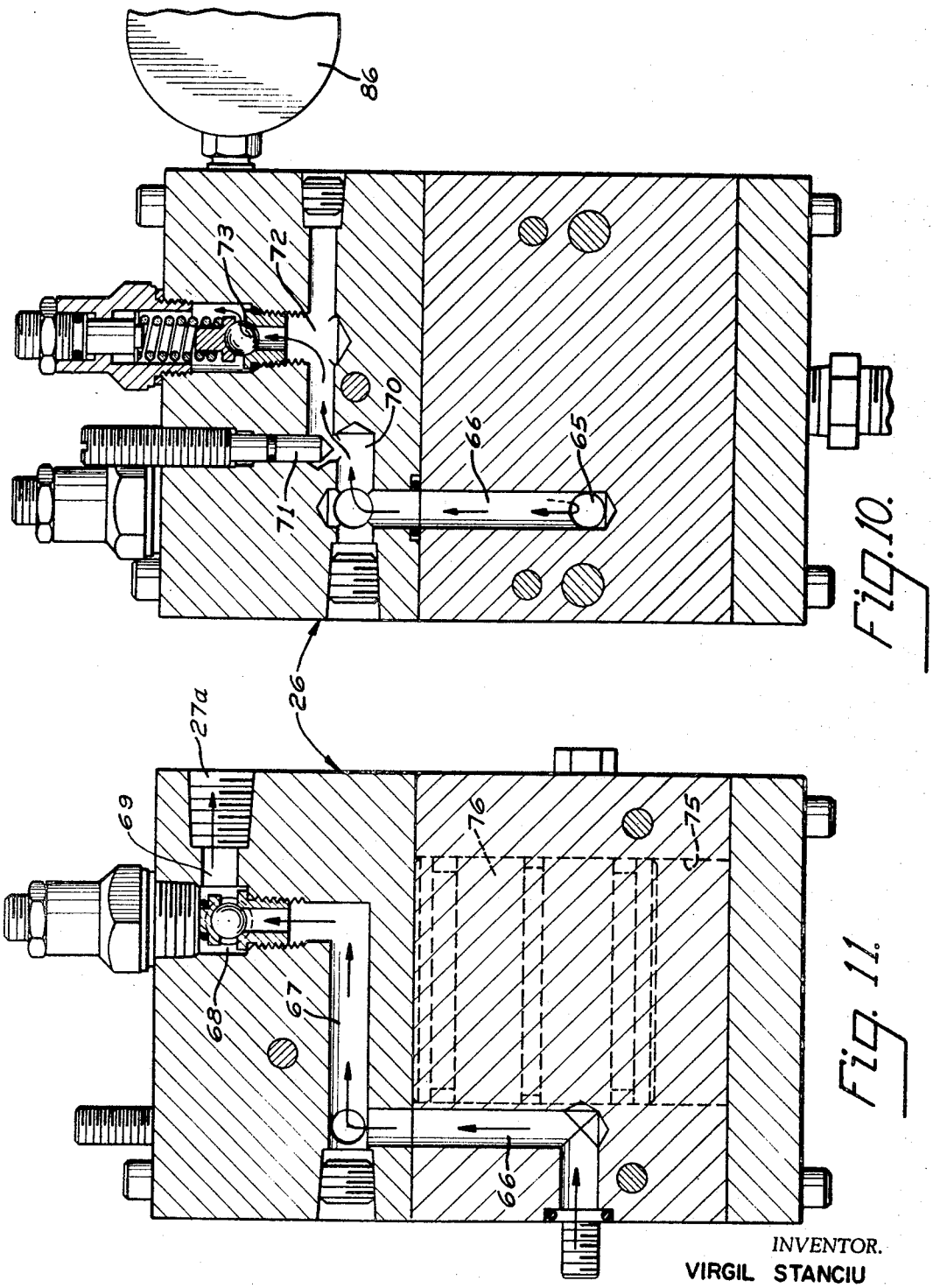

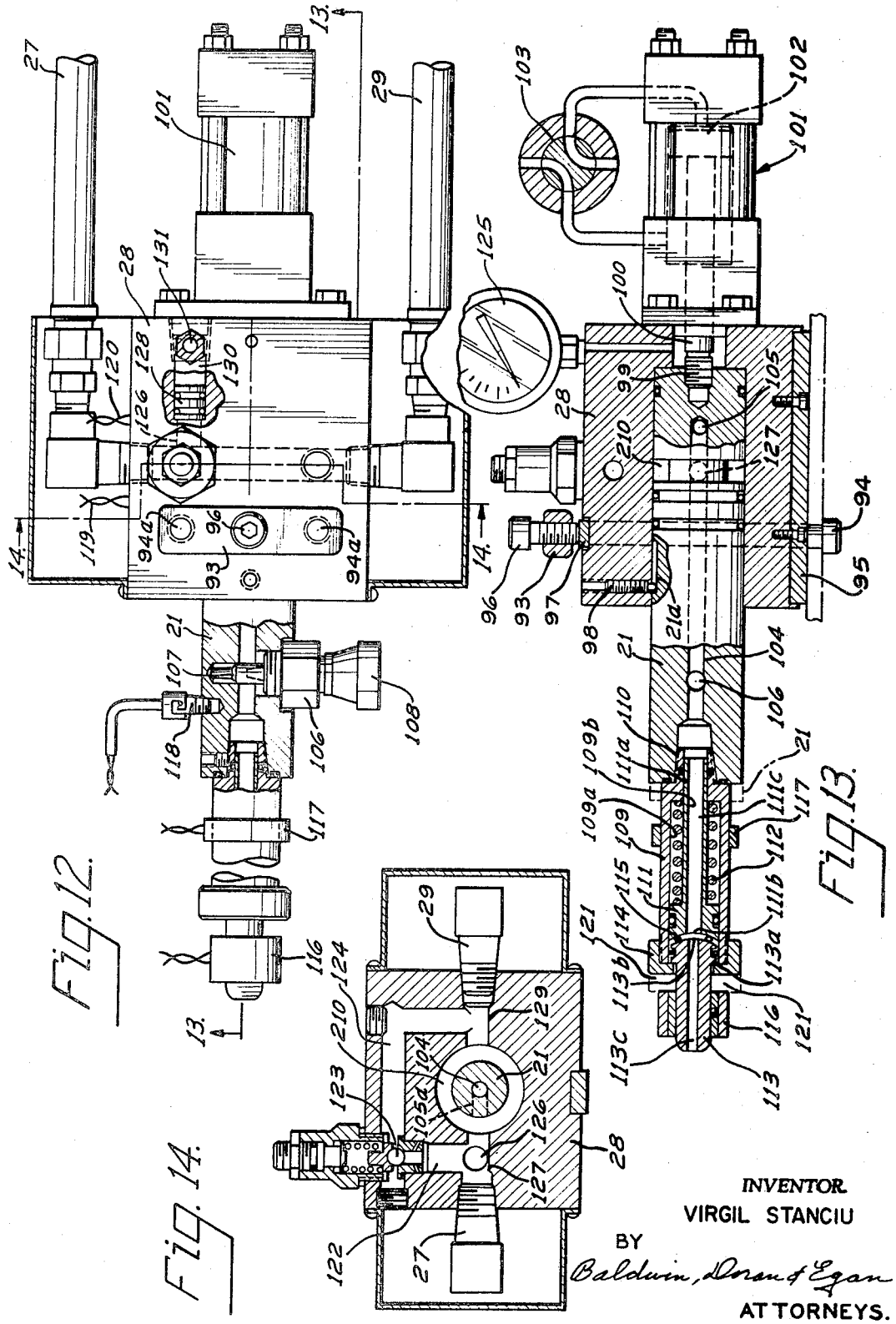

United States Patent Office 3,405,639
Patented Oct. 15, 1968

3,405,639
WAX INJECTION MACHINE
Virgil Stanciu, Rocky River, Ohio, assignor to Tempcraft Tool & Mold, Inc., Cleveland, Ohio, a corporation of Ohio
Filed June 9, 1966, Ser. No. 556,429
4 Claims. (Cl. 103—5)

ABSTRACT OF THE DISCLOSURE

In a wax injection machine, a reservoir filled with hot wax is continually agitated by a slowly rotating helical agitator and is connected by supply and return lines with an injection nozzle. The nozzle has an advanced injecting position and a retracted idle position. Automatic valving in the nozzle by-passes hot wax directly from the supply line to the return line in the idle position of the nozzle and connects the supply line to discharge hot wax at the nozzle in the advanced position thereof. A double-acting reciprocating pump transfers hot wax from the reservoir to the nozzle. In order to maintain a constant flow of hot wax during injection, a booster chamber is provided which is filled with hot wax during a power stroke of the piston of the reciprocating pump through a check valve preventing reverse flow which moves a floating piston in the booster chamber as the chamber is filled. As the pump piston approaches the end of its stroke, hydraulic fluid pressure is supplied to the opposite face of the floating piston so as to force the booster wax directly into the hot wax discharge line independently of the pump cylinder.

---

This invention relates to improvement in a wax injection machine with this invention including improvements in the entire system from wax reservoir to nozzle, together with specific improvements in the wax storage tank, in the pumping mechanism and in the nozzle itself.

This invention is directed to problems in the investment casting industry and particularly to the injection molding of wax forms used in the lost wax process. The invention as a whole then involves a reservoir or tank for hot wax, an injection nozzle mounted adjacent the mold with a stationary housing mounting the nozzle for a reciprocating action from a normal retracted position slightly removed from the mold to an advanced position for injecting the mold, positive pressure means for moving the wax from the reservoir tank to the nozzle to inject the mold including a double acting piston pump and booster combination, and a supply conduit including passageways from the reservoir to and through the pump and booster combination and to and through the housing and nozzle, after which there is a return conduit from the nozzle through the housing back to the reservoir tank. The pump and booster combination comprises means for bleeding off to the booster a minor portion of the wax stream discharged from the pump during each stroke thereof and means for returning to the supply conduit this bled-off wax from the booster during each change of direction of the pump piston at the ends of its stroke. The nozzle and its housing comprise means for a continuous flow of wax from the supply conduit to the return conduit when the nozzle is in its retracted position and for flow from the supply conduit through the nozzle to a mold when the nozzle is in its advanced position and, when the mold is filled, the flow is through a relief valve in the housing to the return conduit. It results from such a system that wax at a very closely controlled temperature is always available with positive pressure in substantially unlimited amounts for injection into a mold and the flow is so continuous through the system that the wax never congeals.

The advantages and essential portions of this invention will be apparent in the accompanying drawings and description and the essential features will be set forth in the appended claims.

Figure 4:
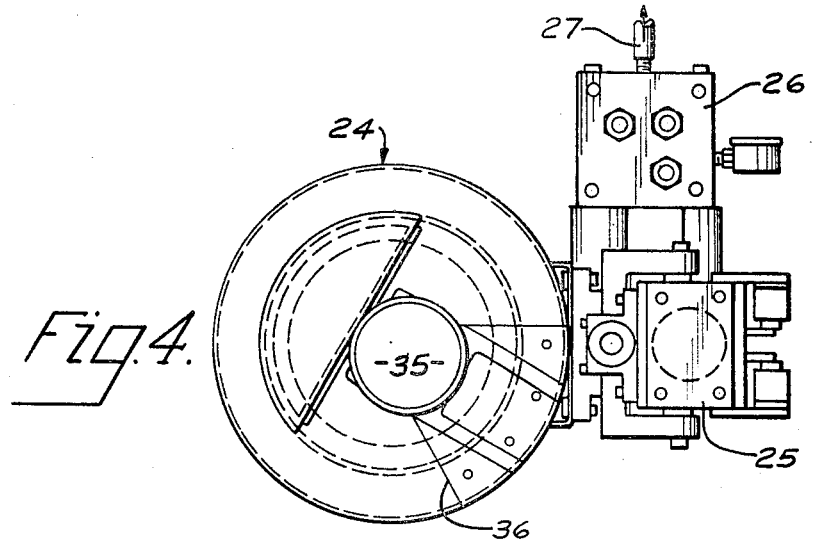
Figure 3:
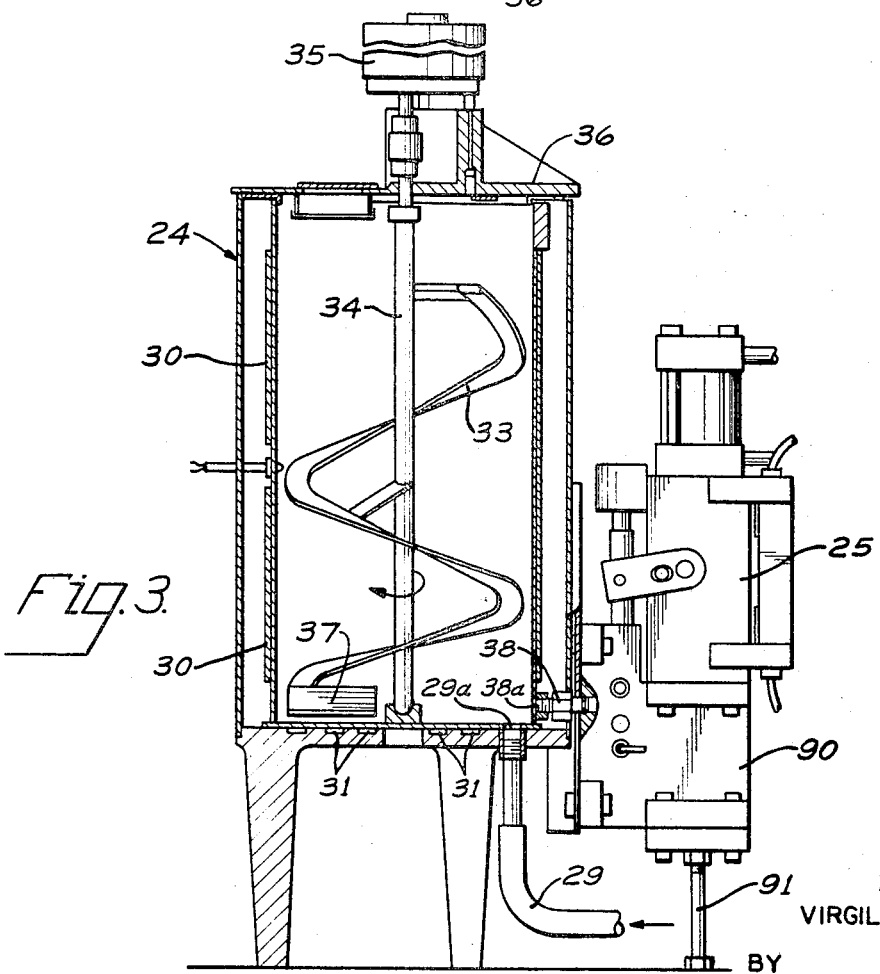

In the drawings,
FIG. 1 is an elevational view of the apparatus of this invention associated with a work table;
FIG. 2 is a side elevational view of the work table taken from the right-hand side of the table in FIG. 1;
FIG. 3 is an elevational view enlarged of the pump and booster combination mounted at the side of the wax reservoir tank of FIG. 1 with the tank broken way in section to more clearly show the agitator therein;
FIG. 4 is a top plan view of the combination of FIG. 3;
FIG. 5 is an elevational view, enlarged, taken at the right-hand side of the pump of FIG. 3 with parts broken away to more clearly show the construction;
FIGS. 6 and 7 are sectional views taken along similarly numbered lines of FIG. 5;
FIG. 8 is a top plan view, enlarged, of the booster seen behind the pump in FIG. 3;
FIGS. 9, 10 and 11 are sectional views taken along similarly numbered lines in FIG. 8;
FIG. 12 is a top plan view, enlarged, of the nozzle seen in FIG. 1 with a portion broken away in section to more clearly show the construction; while
FIGS. 13 and 14 are sectional views taken along similarly numbered lines of FIG. 12.

In FIGS. 1 and 2 is shown a work table 15 suitably supported above floor level with four vertical posts 16 tied together at their upper ends by a heavy plate 17 and mounting a platen 18 for movement toward and away from the work table to clamp a die or mold during injection. The platen is secured to the piston 19 of an hydraulic jack 20 which in turn is supported on the plate 17. The injection nozzle 21 is shown mounted on a mounting bracket 22 for side injection although an identical mounting plate 23 is provided for bottom injection and the nozzle is interchangeable between the brackets 22 and 23 as desired.

A hot wax reservoir or tank 24 is provided with an outlet later described to a double acting piston pump 25 which discharges through a booster 26 to a supply conduit 27 which in turn is connected to a fixed housing 28 in which the nozzle 21 is reciprocatable. The discharge through the nozzle, when not injecting, is through return conduit 29 to the tank 24.

Referring to FIGS. 3 and 4, the tank 24 is insulated and provided with suitable heaters 30 and 31 and a device 32 for both indicating and controlling the temperature of the wax in the tank but these parts need no further description as they are old and well known. Within the tank is a novel agitator adapted to keep the temperature of the wax in the tank uniform throughout but without turbulence. This comprises a helical ribbon agitator 33 rigidly mounted at spaced points on a central drive shaft 34 which is connected at its upper end with a drive motor 35 mounted on the tank cover 36. In one successful form of this invention, the helical member 33 is about 1¼ inches wide and ⅛ inch thick with an outside diameter of the helix of 11 inches where the tank itself has an inside diameter of 11¾ inches. The helix member 33 in this embodiment has about one revolution per foot. It is rotated slowly by the motor 35 so as to avoid turbulence and air occlusion in the wax. Preferably, the lower end of the helix 33 has rigidly attached thereto an inclined blade 37 with its lower edge having slight clearance from the bottom of the tank and in one embodiment the blade 37 being inclined a little under 60° to the horizontal. It will be noted that the inlet 29a to the tank and the outlet 38a are both at the bottom of the tank 24.

In the following description of the pump and booster combination, for the purposes of simplification, the details of construction are either apparent from the drawings or well known in the art. No special comment will be made about seals which are provided at every point where fluid leakage is undesirable.

Referring now to FIGS. 5, 6 and 7, the pump 25 comprises generally a wax pumping cylinder 39 in which reciprocates a double acting piston 40. The piston is actuated by the piston rod 41 connected by a coupling 42 with the piston rod 43 of a double acting hydraulic jack 44 mounted on the opposite end of the cylinder structure. An hydraulic fluid system is provided to control the jack 44 acting through conduits 45 and 46. This includes a standard reversing valve 47 controlled by a solenoid 48 and the pump pressure is supplied by pump 49. This all standard equipment as is well understood. The reversal of valve 47 at each end of the stroke of the wax pumping piston is provided by limit switch LS50 at one end of the stroke and limit switch LS50a at the opposite end. These switches are actuated by arms 51 and 51a, respectively, carrying friction reducing rollers 52 and 52a which engage the collar 42 at opposite ends of the piston stroke.

The flow to and from the wax pumping cylinder 39 is controlled by a spool valve 53 which coacts with the manifolding clearly seen in FIGS. 5 and 6. The spool valve reciprocates in a cylindrical bore 54 controlled by a rod 54a having a suitable bearing at 55. The control of the rod is by means of a yoke 55 having a pivotal mounting at 56, the yoke moving a pin 57, carried in valve stem 54a, because of the fact that the pin 57 and associated collars 57a are captured in notches 58 in yoke 55. The yoke position is controlled by a block 59 which is slidably mounted on four pins 60 which are fixed relative to the pump base. Referring to FIG. 6, when the collar 42 engages shoulder 59a on the block 59 in the position of the parts in FIG. 6, then pin 59c carried by block 59 moves in a lost motion opening 61 in the yoke 55 to carry the spool valve 53 downward as viewed in FIG. 6. At the opposite end of the pump stroke, collar 42 engages the shoulder 59b on the block 59 carrying the pin 59c upward as viewed in FIG. 6 so as to carry the spool valve 53 to an uppermost position for a purpose later described.

Referring to FIGS. 5 and 6, the flow of wax through pump 25 with the piston 40 in the position shown in FIG. 6 and ready to start upwardly therein is as follows. The hot wax flow is from tank 24 through the section pipe 38 to the pump. It then passes through the spool valve between collars B and C, through manifold passageway 62 into 39 below piston 40 as seen in FIG. 6. As piston 40 moves upwardly in FIG. 6, the wax forced out of cylinder 39 thereby passes through manifold passageway 63 and between the spool collars C and D and out through manifold passageways 64 and 65 and into the booster 26. With the piston 40 at the upper end of cylinder 39 as seen in FIG. 6, the spool valve 53 is in a position raised from that shown in FIG. 6 to the point where collar C of the spool lies between the passageways 63 and 64. The wax flow is then as follows. Entering through section line 38 the wax passes between spool collars B and C through passageways 63 to cylinder 39 above the piston 40. The wax material forced out of the cylinder below piston 40 leaves the cylinder through passageway 62, passing between collars A and B of the spool valve to discharge through outlet passageway 65 to the booster 26.

In FIGS. 8 through 11 is shown the details of the booster 26 with its associated manifold. It is well understood that in a double acting pump like that shown at 25, the pressure flow stops at each end of the stroke of piston 40 while the piston is changing direction. The purpose of booster 26 is to add a pressure flow at these points.

The flow from pump discharge passageway 65 enters booster passageways 66 and 67, passes through check valve 68 against the bias thereof through passageway 69 to discharge at port 27a into the supply conduit 27. While the pressure fluid is moving away from pump 25 in the manner just described, a minor portion of this flow is bled off through passageway 70, needle valve 71, passageway 72, through check valve 73 against the bias thereof and through passageway 74 to cylinder 75 which is the booster chamber. A floating booster piston 76 separates the booster into a wax chamber 75a and an hydraulic fluid chamber 75b on opposite faces of the piston 76. The outlet from chamber 75b is through port 77 to a source of hydraulic pressure fluid 78 connected through a reversing valve 79 and suitable piping 80 to the port 77. A solenoid 81 controls the pressure in chamber 75b, such pressure being substantially zero when wax under pressure is entering chamber 75a through conduit 74. Just before piston 40 reaches either end of its stroke, collar 42 actuates limit switch 82 at one end or limit switch 82a at the other end by means of an arm and roller combination 83 or 83a, respectively, similar in all respects to the arm 51 and roller 52 previously described in connection with limit switches 50 and 50a. The timing is such that limit switch 82 or 82a energizes solenoid 81 just before piston 40 reaches either end of its stroke. At such a time the solenoid 81 causes a reversal of control valve 79 so that pressure fluid from pump 78 travels through valve 79 and conduit 80 through port 77 to chamber 75b so as to provide pressure against piston 76 driving it upwardly as seen in FIG. 9 to force hot wax out the conduit 84 through check valve 85 against the bias thereof and through conduits 86 and 69 to the discharge port 27a and into the supply conduit 27. The pressure exerted in chamber 75b against piston 76 is sufficient to produce pressure at this period in the supply conduit 27 equal to that which existed during the main portion of the stroke 40 so that wax flows at a substantially even rate at all times during the operation of the pump and booster combination. During the flow just described, the check valve 73 prevents discharge of hot wax from the booster cylinder 75 through conduit 74.

Booster fluid pressure may be read by means of gauge 86 (FIG. 8) which is connected through hydraulic fluid line 87 to one side of a floating piston 88, the other side of which is subject to wax pressure in the short conduit 89 communicating with conduit 74.

It should be understood that the pump 25 is mounted to a weldment 90 which in turn is secured to tank 24 and supported on the floor by a foot member 91. The booster is secured by bolts 92 which pass through the booster block and enter into lugs on the pump housing casting.

The needle valve 71 may be regulated to control the amount of pressure fluid bled off during a stroke of piston 40. Only sufficient material is needed to supply pressure fluid in supply conduit 27 until the piston has changed direction and again taken up another stroke.

As clearly seen in FIGS. 12, 13 and 14, the nozzle 21 is mounted for slight reciprocation in a fixed housing 28. Quick releasable clamp means is utilized to fasten the housing 28 and the nozzle 21 to one of the mounting brackets 22 or 23. To this end, a clamp bracket 93 is connected by two bolts 94 to a bottom clamping plate 95. The bolts 94 pass through the threaded openings 94a in the clamp bracket 93. A clamp screw 96 is threaded through the clamp bracket 93 at the center thereof and abuts against a wear plate 97 on the top of housing 28. The screwing of member 96 will tighten or loosen the clamp. When the nozzle 21 is clamped in position a set screw 98 engages in a narrow slot 21a in the top of nozzle 21 to prevent rotation thereof while permitting axial movement relative to the housing 28.

The nozzle 21 has a normal retracted position between injection operations which is shown in full line in FIG. 13. When moved to the left slightly to the dot-dash position of FIG. 13, the nozzle is engaged against the gate of a mold to be injected. For reciprocating the nozzle for this small amount of movement, preferably the nozzle 21 has a threaded connection 99 with the piston rod 100 of a jack 101 having a double acting piston 102 supplied with pressure fluid from hydraulic source not shown acting through a reversing valve 103 which has two connections for driving the piston 102 in opposite directions. The reversing of valve 103 may be by hand or it may be done by timer which is no part of the present invention.

The nozzle 21 has a central through passageway 104, the inlet to which is at the rear end as viewed in FIG. 13 through a short lateral passageway 105 which opens at the side of the nozzle farthest away from the viewer in FIG. 13. Along said passageway means is provided to control the amount of wax flowing through the nozzle to the discharge end thereof. In this case, it takes the form of a control valve 106 which is adjustable relative to a valve seat 107 by means of threaded connection controlled by knob 108.

The discharge end of the nozzle is provided with a connection permitting slight misalignment between the nozzle and the gate of the mold to be injected. In this embodiment there is provided a hollow shell 109 having a threaded connection at 110 with the main body of the nozzle barrel. An inner nose portion 111 has a sliding fit in the internal bore 109a of the shell 109. The inner nose portion has a rearward extension 111a having a bearing at 109b in the shell 109 to guide the nose portion for slight reciprocating motion. A helical compression spring 112 embraces the projection 111a and is held between a shoulder on the shell and a shoulder on the nose portion so as to urge the nose portion forwardly. An outer nose portion 13 has a sealed fit at the rear end thereof in the shell 109 and has a shoulder 113a by which the outer nose portion is attached to the shell 109 by means of a threaded collar 114. The mating faces 111b of the inner nose portion and 113b of the outer nose portion are coacting arcuate, or preferably spherical, surfaces having their curved or arc centers on the center line of the passageway 104. Shown at 115 is a sealing member between these two faces. Both inner and outer nose portions have central longitudinal passageways 111c and 113c respectively which are extensions of and in alignment with the main passageway 104. Electric heaters 116 and 117 are provided, together with a thermocouple and control means 118 so as to keep the nozzle at the proper temperature. Connections for electric heating cartridge are also shown at 119 and 120 to heat the desired parts to the proper temperature.

It results from the structure described at the nose of the nozzle that the discharge end of the outer nose portion 113 may be out of alignment with the gate to be injected by as much as a quarter of an inch from the center line of the passageway 104, 111c, 113c, and still do a good job. The mating surfaces 111b and 113b permit such a combination. During such an injection operation, pressure on the nose portion 113 toward the right as viewed in FIG. 13 compresses spring 112 and takes up all or part of the space at the zone 121.

Upon the completion of a mold injection operation, the nozzle is withdrawn from contact with the mold gate whereupon the spring 112 returns the parts to the position shown in FIG. 13 at which time the shoulder 113a on the outer nose portion engaging the collar 114 squares up the outer nose portion into true alignment with the rest of the nozzle as shown in FIG. 13.

The main body of the nozzle 21 is easily removed from the housing 28 by retracting the set screw 98 and releasing the clamp 93 by means of the screw 96. The main body 21 can then be loosened at the threaded connection 99.

The flow of wax through the nozzle in the retracted position of the nozzle as shown in FIG. 13 is by way of the supply conduit 27, a mating port 127 in the housing 28, an annular bypass groove 210 in the nozzle body 21 and an outlet port 129 to the return conduit 29. When the nozzle is moved to its advanced or injection position, the short passageway 105a and the injection port 105 is aligned with inlet port 127 so the flow is directly from the supply conduit 27 to the nose of the nozzle with the flow to the return conduit 29 being blocked. When the part is fully injected and pressure continues to build up within the central passageway of the nozzle, then the pressure in passageway 122, FIG. 14, opens the check valve 123 for flow through the by-pass 124 to the return conduit 29.

Wax pressure at the nozzle is read on gauge 125 by pressure exerted in passageway 126 against a floating piston 128 which pressure is transmitted through hydraulic fluid in passageways 130 and 131 to the gauge.

It should be noted that in addition to specific heaters which have been mentioned, other heating means is supplied where necessary to maintain the wax in a flowable condition in the apparatus described, especially through the elongated conduits 27 and 29.

What is claimed is:

1. In a pump having a piston reciprocatable in a cylinder and having fluid inlet and outlet lines communicating with said cylinder at one end thereof, a booster reservoir having one end in communication with said outlet line, means for bleeding off a minor portion of the fluid pumped by said piston during each stroke thereof and including one-way flow means for conducting said bleed-off fluid to said one end of said reservoir, and means for forcing said fluid out of said reservoir and by-passing said cylinder into said outlet line responsive to reversal of said piston at the end of its stroke.

2. The combination of claim 1 wherein said booster reservoir is a booster cylinder having a floating piston closely fitting and reciprocatable therein, said means for conducting bleed-off fluid to said reservoir including an inlet-outlet connection with one end of said booster cylinder, one face of said floating piston facing said inlet-outlet opening, means subjecting the other face of said floating piston to a force (a) less than sufficient to resist said pump discharge pressure effective through said pressure fluid effective against said one face during a stroke of said pump piston, and (b) great enough to substantially equal normal pump discharge working pressure at said inlet-outlet connection during pump stroke reversal, and check valve means preventing fluid flow from said booster cylinder toward said pump.

3. The combination of claim 2 wherein a boosting fluid supply communicates with said other face of said floating piston, and control means responsive to the cycle of said pump piston for regulating the pressure of said boosting fluid supply to a lower value during a pump stroke and to a higher value during a pump stroke reversal.

4. The combination of claim 1 wherein said bleeding off means includes an adjustable needle valve.

References Cited
UNITED STATES PATENTS

| | | | |
|---|---|---|---|
| 1,776,937 | 9/1930 | Timbs et al. | 103—223 XR |
| 2,565,374 | 8/1951 | Kitchel | 103—223 XR |
| 3,303,786 | 2/1967 | Fanshawe | 103—52 |

ROBERT M. WALKER, *Primary Examiner.*